(12) United States Patent
Dan

(10) Patent No.: US 7,629,065 B2
(45) Date of Patent: Dec. 8, 2009

(54) FUEL CELL SYSTEM WITH A FIRST AND SECOND ELECTRICALLY CONDUCTIVE CASING

(75) Inventor: Koji Dan, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 11/793,878

(22) PCT Filed: Dec. 22, 2005

(86) PCT No.: PCT/JP2005/024182

§ 371 (c)(1),
(2), (4) Date: Jun. 21, 2007

(87) PCT Pub. No.: WO2006/068321

PCT Pub. Date: Jun. 29, 2006

(65) Prior Publication Data

US 2008/0085435 A1    Apr. 10, 2008

(30) Foreign Application Priority Data

Dec. 22, 2004  (JP) ............................. 2004-370839

(51) Int. Cl.
*H01M 8/24*  (2006.01)
*H01M 8/00*  (2006.01)
*H01M 8/04*  (2006.01)

(52) U.S. Cl. .............................. 429/18; 429/13; 429/26

(58) Field of Classification Search ....................... None
See application file for complete search history.

(56) References Cited

U.S. PATENT DOCUMENTS

| 3,507,704 | A | * | 4/1970 | Webb et al. ................ 429/19 |
| 4,414,294 | A | * | 11/1983 | Guthrie ..................... 429/35 |
| 2001/0009732 | A1 | * | 7/2001 | Schuler ..................... 429/19 |
| 2001/0046619 | A1 | * | 11/2001 | Allen ........................ 429/37 |

FOREIGN PATENT DOCUMENTS

| GB | 964467 | 7/1964 |
| JP | 2000-340249 | 12/2000 |
| JP | 3251919 | 12/2000 |

* cited by examiner

*Primary Examiner*—Dah-Wei D Yuan
*Assistant Examiner*—Kwang Han
(74) *Attorney, Agent, or Firm*—Lahive & Cockfield, LLP; Anthony A. Laurentano, Esq.

(57) ABSTRACT

In a fuel cell system, an electrically conductive first case unit and an electrically conductive second case unit are fixed by screws such that insulating members are interposed between the first case unit and the second case unit. A load applying mechanism is provided in the first case unit. A fuel cell stack, a heat exchanger, and a reformer are provided in the second case unit. One pole of the fuel cell stack is electrically connected to the first case unit through an electrically conductive end plate, and the other pole of the fuel cell stack is electrically connected to the second case unit through an electrically conductive end plate.

5 Claims, 10 Drawing Sheets

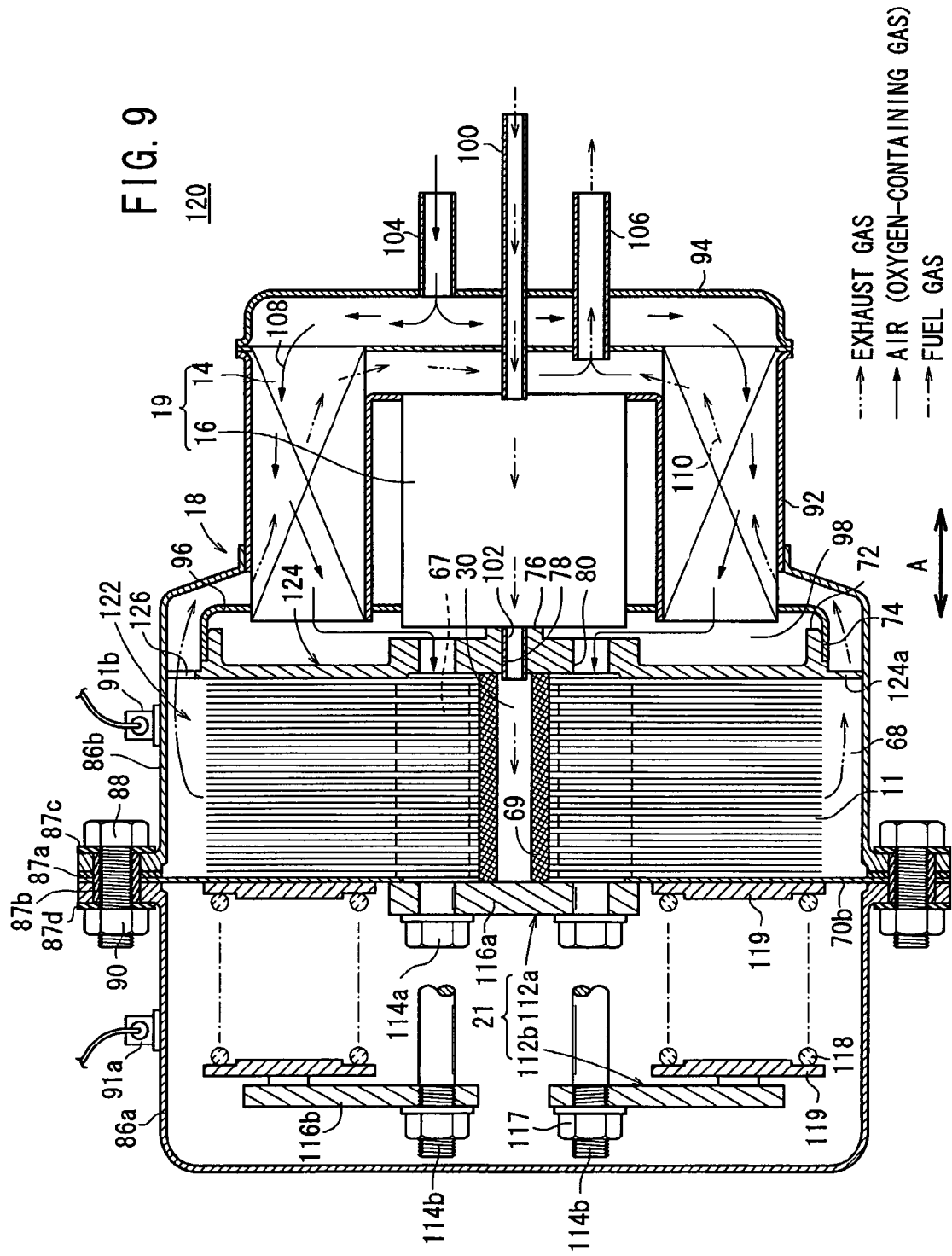

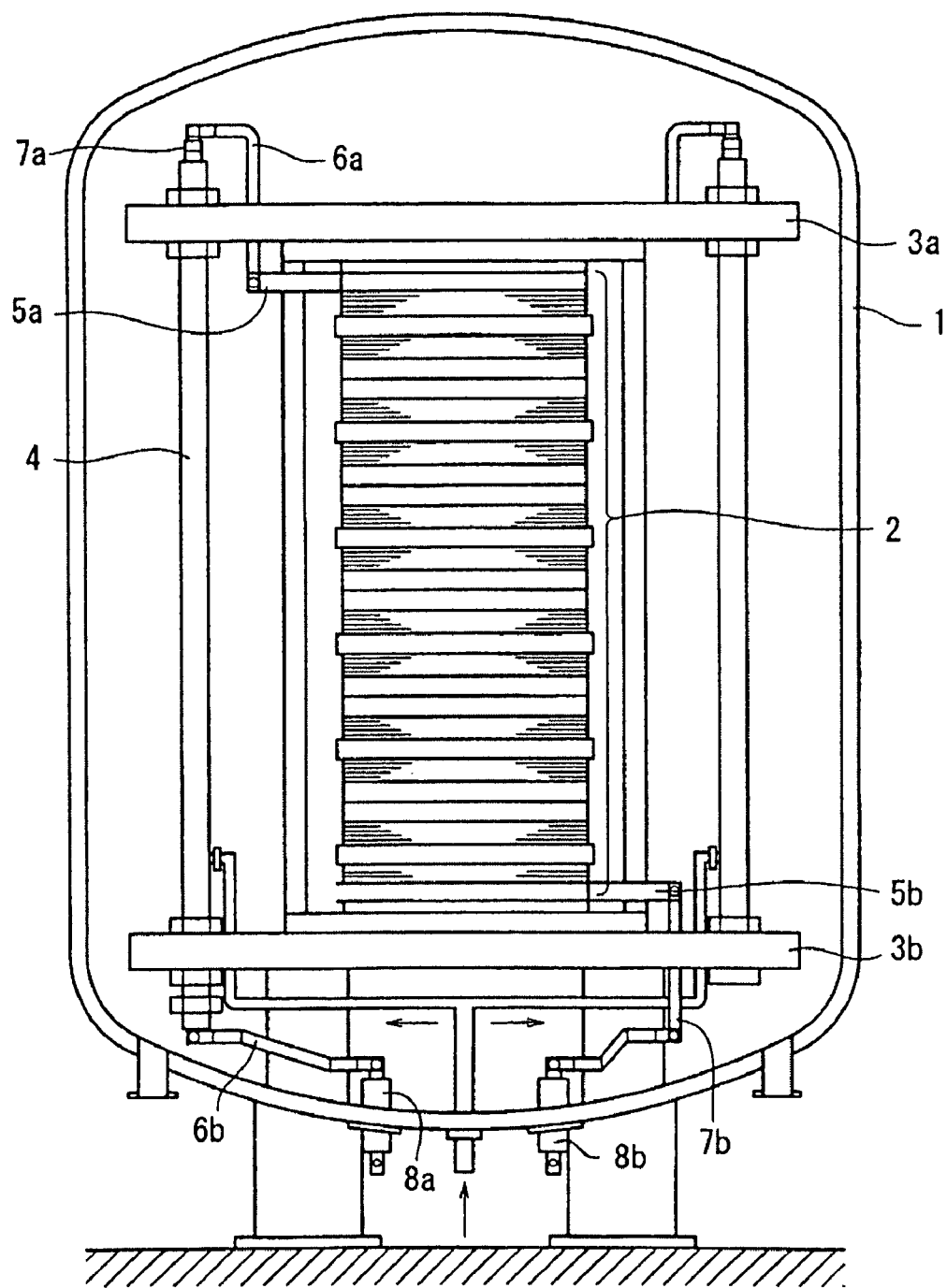

US 7,629,065 B2

FUEL CELL SYSTEM WITH A FIRST AND SECOND ELECTRICALLY CONDUCTIVE CASING

RELATED APPLICATIONS

This application is a 35 U.S.C. 371 national stage filing of International Application No. PCT/JP2005/024182 filed 22 Dec. 2005, which claims priority to Japan Patent Application No. 2004-370839 filed on 22 Dec. 2004 in Japan. The contents of the aforementioned applications are hereby incorporated by reference.

TECHNICAL FIELD

The present invention relates to a fuel cell system including a fuel cell stack provided in a casing. The fuel cell stack is formed by plurality of the fuel cells. Each of the fuel cells includes stacking a an electrolyte electrode assembly and separators sandwiching the electrolyte electrode assembly. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined number of the unit cells and the separators are stacked together to form a fuel cell stack.

In the fuel cell, an oxygen-containing gas or the air is supplied to the cathode. The oxygen in the oxygen-containing gas is ionized at the interface between the cathode and the electrolyte, and the oxygen ions ($O^{2-}$) move toward the anode through the electrolyte. A fuel gas such as a hydrogen-containing gas or CO is supplied to the anode. Oxygen ions react with the hydrogen in the hydrogen-containing gas to produce water or react with CO to produce $CO_2$. Electrons released in the reaction flow through an external circuit to the cathode, creating a DC electric energy.

In the fuel cell, for example, cables as disclosed in Japanese Patent No. 3,251,919 are used for collecting the electrical current at the time of power generation. In the conventional technique, as shown in FIG. 10, a fuel cell stack 2 is provided in a pressure container 1. The fuel cell stack 2 is formed by stacking fuel cells vertically. Components of the fuel cell stack 2 are tightened together using tightening bolts 4 inserted into an upper tightening plate 3a and a lower tightening plate 3b.

Each of the tightening bolts 4 has a cylindrical shape. A current cable 7a is connected to an upper terminal 5a of the fuel cell stack 2 through an upper cable 6a. The current cable 7a is inserted into one of the tightening bolts 4. A current collecting portion 8a is connected to a lower end of the current cable 7a through a lower cable 6b.

A current cable 7b is connected to a lower terminal 5b of the fuel cell stack 2, and the current cable 7b is connected to a current collecting portion 8b. The current collecting portions 8a, 8b are exposed to the outside of the pressure container 1.

However, in the conventional technique, heat in the pressure container 1 is transmitted easily through the tightening bolts 4, the lower cable 6b, and the current collecting portion 8a, and a large heat loss occurs. Further, a plurality of tightening bolts 4 are provided on the side portions of the fuel cell stack 2. Thus, the effective space in the pressure container 1 is limited, and the heat capacity is large.

Further, the current collecting portions 8a, 8b are provided at lower positions of the pressure container 1. Therefore, the current collecting structure is constrained. The current collecting portions 8a, 8b cannot be positioned at arbitrary positions, and the layout cannot be designed freely.

DISCLOSURE OF INVENTION

A main object of the present invention is to provide a fuel cell system in which a current collecting structure is freely designed, and it is possible to suitably reduce heat losses with a simple and compact structure.

The present invention relates to a fuel cell system including a fuel cell stack provided in a casing. The fuel cell stack is formed by stacking a plurality of fuel cells in a stacking direction. Each of the fuel cells includes an electrolyte electrode assembly and separators sandwiching the electrolyte electrode assembly. The electrolyte electrode assembly includes an anode, a cathode, and an electrolyte interposed between the anode and the cathode.

The casing includes first and second electrically conductive casings, and the first and second electrically conductive casings are fixed such that an insulating member is interposed between the first and second electrically conductive casings for insulating the first and second electrically conductive casings from each other. The first electrically conductive casing is electrically connected to one pole of the fuel cell stack. The second electrically conductive casing is electrically connected to the other pole of the fuel cell stack.

It is preferable that a load applying mechanism for applying a tightening load to the fuel cell stack in the stacking direction is provided in the first electrically conductive casing. The fuel cell stack, a heat exchanger for performing heat exchange between an oxygen-containing gas to be supplied to the fuel cell stack and an exhaust discharged from the fuel cell stack, and a reformer for reforming a fuel to produce a fuel gas are provided in the second electrically conductive casing.

Further, it is preferable that a gas barrier is provided between the first electrically conductive casing and the second electrically conductive casing for preventing a flow of an exhaust gas from the second electrically conductive casing into the first electrically conductive casing. It is also preferable that the gas barrier includes an electrically conductive end plate for electrically connecting one pole of the fuel cell stack and the first electrically conductive casing.

Further, it is preferable that an electrically conductive end plate is provided at an end of the fuel cell stack opposite to the gas barrier for electrically connecting the other pole of the fuel cell stack and the second electrically conductive casing.

BRIEF DESCRIPTION OF DRAWINGS

FIG. 9 is a partial cross sectional view showing a fuel cell system according to a second embodiment of the present invention; and FIG. 10 is a view schematically showing structure of a fuel cell according to a conventional technique.

BEST MODE FOR CARRYING OUT THE INVENTION

Figure 1:
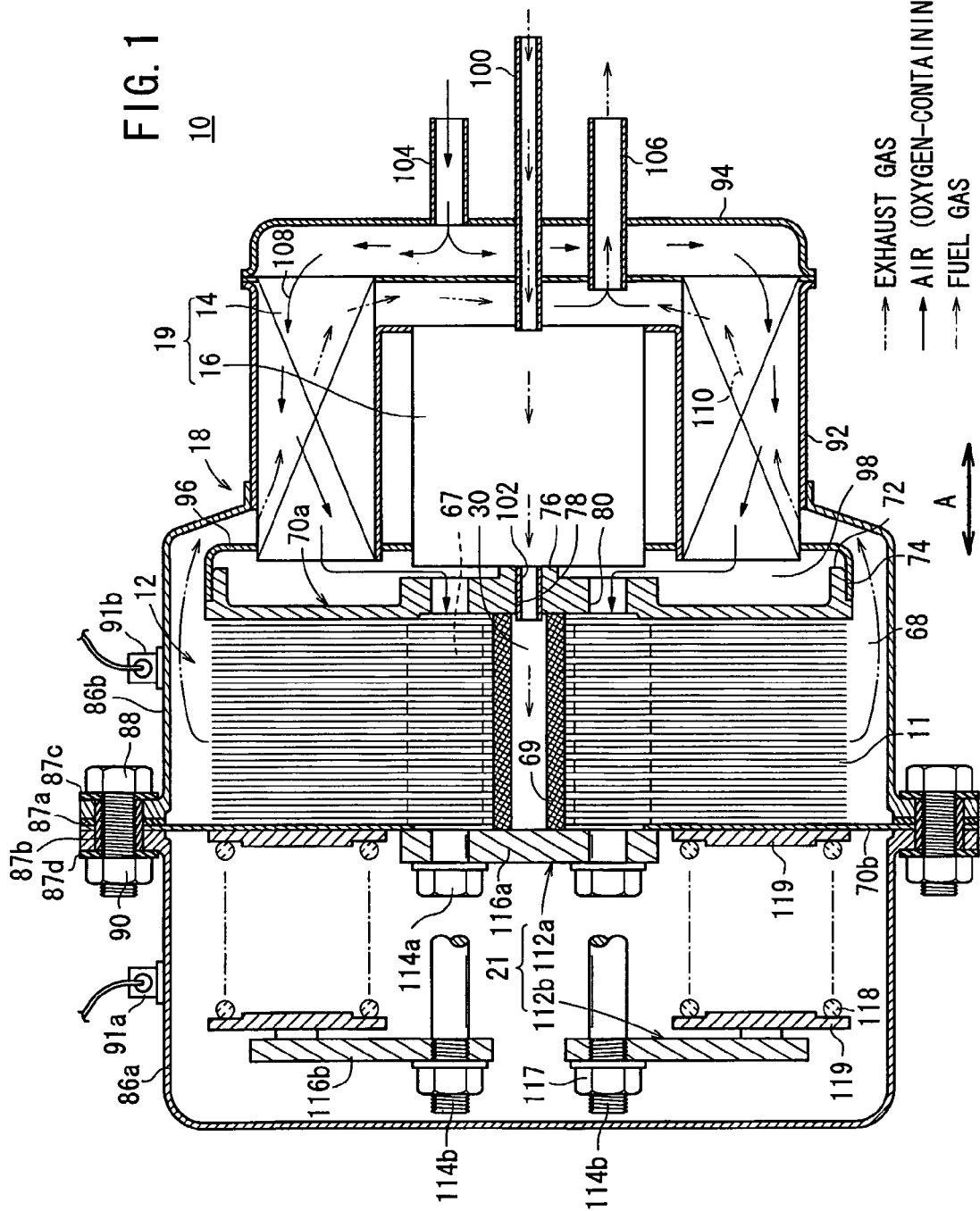
FIG. 1 is a partial cross sectional view showing a fuel cell system according to a first embodiment of the present invention.
Figure 2:
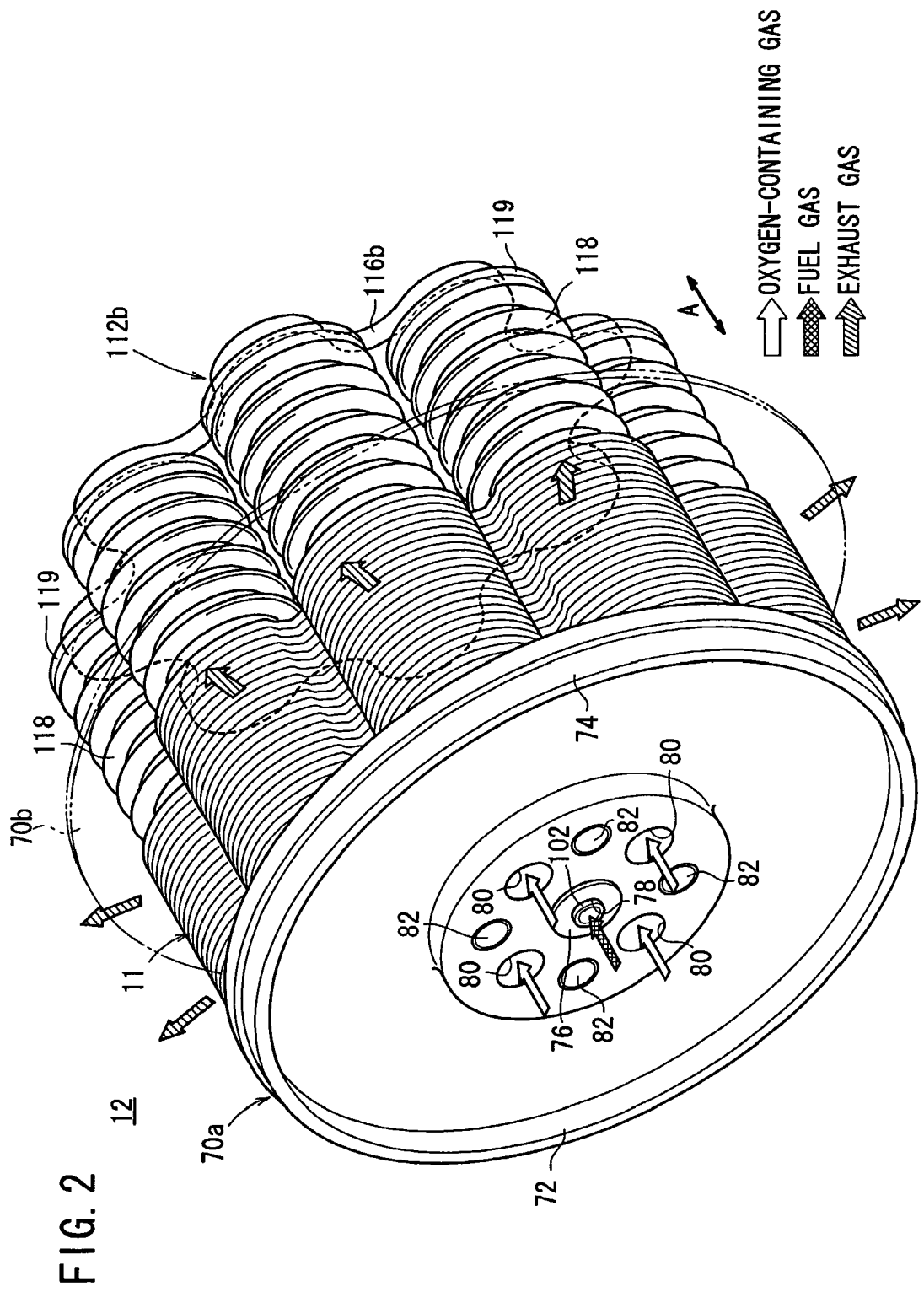
FIG. 2 is a perspective view schematically showing a fuel cell stack of the fuel cell system.

FIG. 1 is a partial cross sectional view showing a fuel cell system 10 according to a first embodiment of the present invention. FIG. 2 is a perspective view schematically showing a fuel cell stack 12 of the fuel cell system 10. The fuel cell stack 12 is formed by stacking a plurality of fuel cells 11 in a direction indicated by an arrow A.

The fuel cell system 10 is used in various applications, including stationary and mobile applications. For example, the fuel cell system 10 is mounted on a vehicle. As shown in FIG. 1, the fuel cell system 10 includes the fuel cell stack 12, a heat exchanger 14, a reformer 16, and a casing 18. The heat exchanger 14 heats the oxygen-containing gas before it is supplied to the fuel cell stack 12. The reformer 16 reforms a fuel to produce a fuel gas. The fuel cell stack 12, the heat exchanger 14, and the reformer 16 are disposed in the casing 18.

In the casing 18, a fluid unit 19 including at least the heat exchanger 14 and the reformer 16 is disposed on one side of the fuel cell stack 12, and a load applying mechanism 21 for applying a tightening load to the fuel cells 11 in the stacking direction indicated by the arrow A is disposed on the other side of the fuel cell stack 12. The fluid unit 19 and the load applying mechanism 21 are provided symmetrically with respect to the central axis of the fuel cell stack 12.

Figure 3:
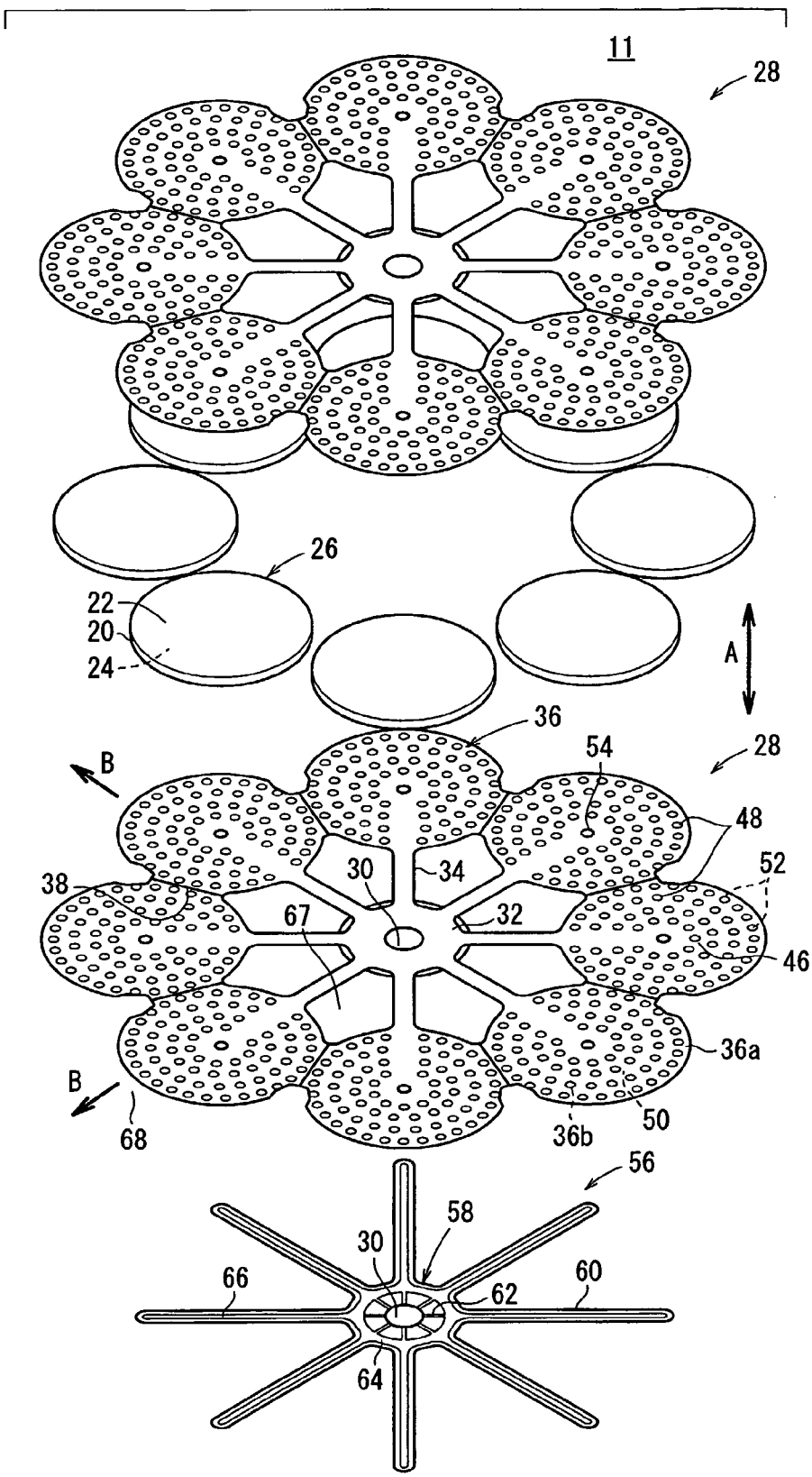
FIG. 3 is an exploded perspective view showing the fuel cell of the fuel cell stack.
Figure 4:
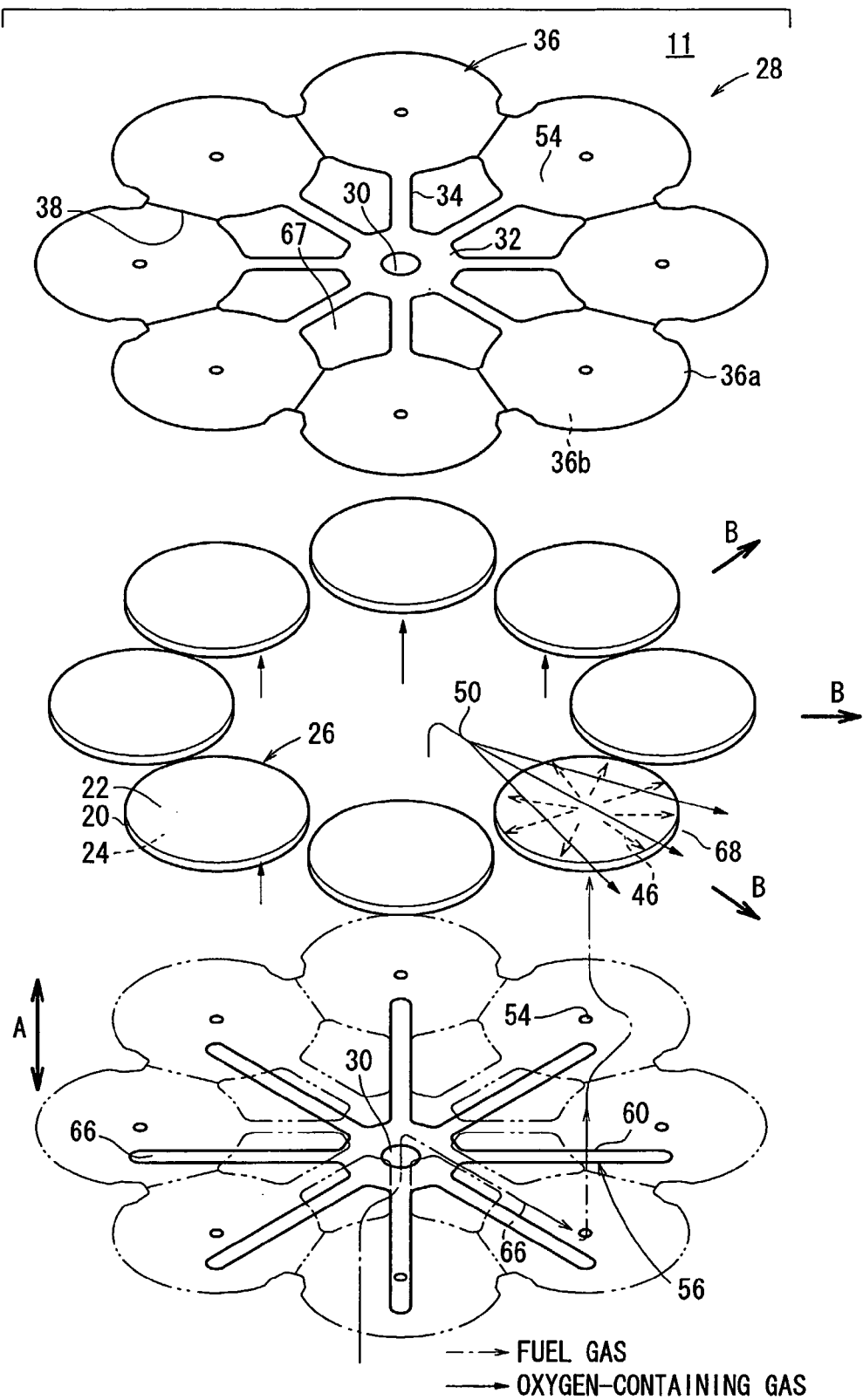
FIG. 4 is a partial exploded perspective view showing gas flows in the fuel cell.

The fuel cell 11 is a solid oxide fuel cell (SOFC). As shown in FIGS. 3 and 4, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the inner circumferential edge of the electrolyte electrode assembly 26 for preventing the entry of the oxygen-containing gas.

A plurality of, e.g., eight electrolyte electrode assemblies 26 are interposed between a pair of separators 28 to form the fuel cell 11. The eight electrolyte electrode assemblies 26 are concentric with a fuel gas supply passage 30 extending through the center of the separators 28.

In FIG. 3, for example, each of the separators 28 comprises a metal plate of, e.g., stainless alloy or a carbon plate. The separator 28 has a first small diameter end portion 32. The fuel gas supply passage 30 extends through the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals). The circular disk 36 and the electrolyte electrode assembly 26 have substantially the same size. The adjacent circular disks 36 are separated from each other by slits 38.

Each of the circular disks 36 has first protrusions 48 on its surface 36a which contacts the anode 24. The first protrusions 48 form a fuel gas channel 46 for supplying a fuel gas along an electrode surface of the anode 24. Each of the circular disks 36 has second protrusions 52 on its surface 36b which contacts the cathode 22. The second protrusions 52 form an oxygen-containing gas channel 50 for supplying the oxygen-containing gas along an electrode surface of the cathode 22 (see FIG. 5).

Figure 6:
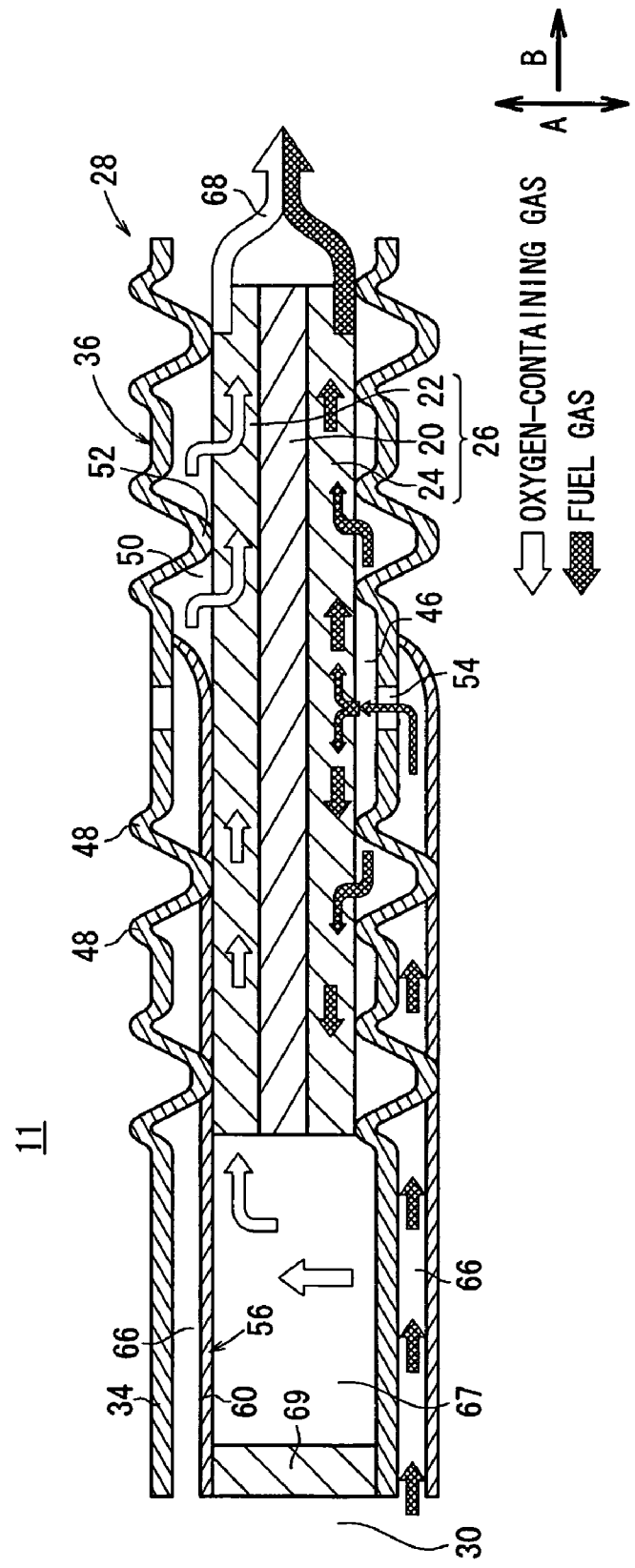
FIG. 6 is a cross sectional view schematically showing operation of the fuel cell.
Figure 7:
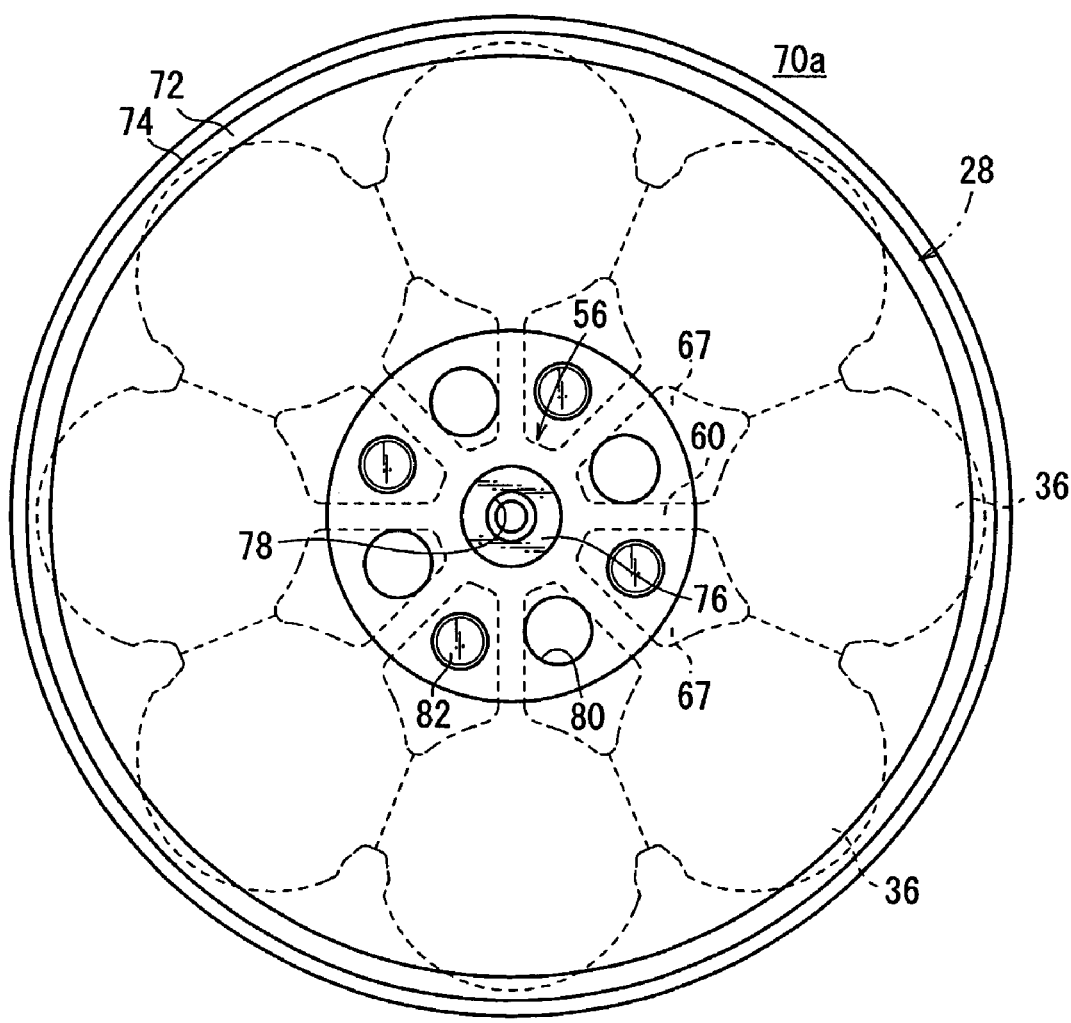
FIG. 7 is a front view showing an end plate of the fuel cell stack.

As shown in FIG. 6, the first protrusions 48 and the second protrusions 52 protrude away from each other. The first protrusions 48 are ring shaped protrusions, and the second protrusions 52 are mountain shaped protrusions. The second protrusions (mountain shaped protrusions) 52 are surrounded by the first protrusions (ring shaped protrusions) 48.

Figure 5:
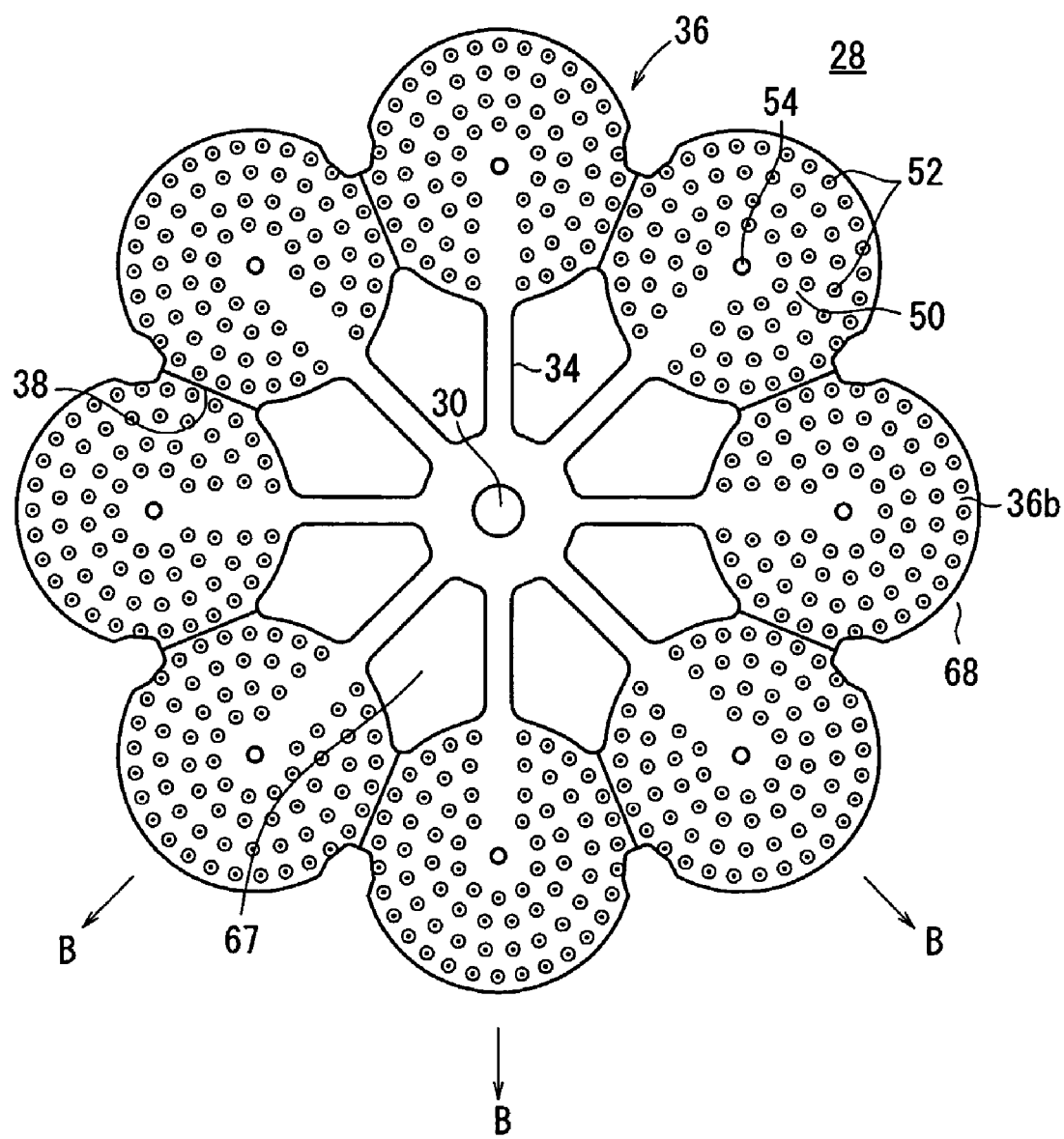
FIG. 5 is a front view showing a separator of the fuel cell.

As shown in FIGS. 3 to 5, a fuel gas inlet 54 is provided in each of the circular disks 36. The fuel gas flows through the fuel gas inlet 54 into the fuel gas channel 46. The position of the fuel gas inlet 54 is determined so that the fuel gas can be distributed uniformly. For example, the fuel gas inlet 54 is provided at the center of the circular disk 36.

A channel member 56 is fixed to the separator 28 by brazing or laser welding on a surface facing the cathode 22. As shown in FIG. 3, the channel member 56 includes a second small diameter end portion 58. The fuel gas supply passage 30 extends through the center of the second small diameter end portion 58. Eight second bridges 60 extend radially from the second small diameter end portion 58. Each of the second bridges 60 is fixed to the separator 28, from the first bridge 34 to the fuel gas inlet 54 of the circular disk 36.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. The recess 64 prevents the flow of the brazing material, and achieves the uniform flow of the fuel gas. A fuel gas supply channel 66 is formed between the first and second bridges 34, 60. The fuel gas supply channel 66 is connected to the fuel gas channel 46 through the slits 62 and the recess 64.

As shown in FIG. 6, the oxygen-containing gas channel 50 is connected to an oxygen-containing gas supply unit 67. The oxygen-containing gas is supplied in the direction indicated by the arrow B through the space between the inner circumferential edge of the electrolyte electrode assembly 26 and the inner circumferential edge of the circular disk 36. The oxygen-containing gas supply unit 67 is formed by spaces between the inner sides of the respective circular disks 36 and the first bridges 34, and extends in the stacking direction.

Insulating seals 69 for sealing the fuel gas supply passage 30 is provided between the separators 28. For example, the insulating seals 69 are made of mica material, or ceramic material. An exhaust gas channel 68 extends through the fuel cells 11 in the stacking direction outside the respective circular disks 36.

As shown in FIGS. 1 and 2, the fuel cell stack 12 includes a plurality of fuel cells 11 stacked together, and end plates (electrically conductive end plates) 70a, 70b provided at opposite ends in the stacking direction. The end plate 70a has a substantially circular disk shape. A ring shaped portion 72 is formed in the outer circumferential region of the end plate 70a. The ring shaped portion 72 axially protrudes from the end plate 70a. A groove 74 is formed around the ring shaped portion 72. A columnar protrusion 76 is provided at the center of the ring shaped portion 72. The columnar protrusion 76 and the ring shaped portion 72 protrude from the end plate 70a in the same direction. A hole 78 is formed at the center of the protrusion 76.

In the end plate 70a, holes 80 and screw holes 82 are formed alternately along a virtual circle around the protrusion 76. The holes 80 and the screw holes 82 are spaced from each other by predetermined intervals (angles). As shown in FIG. 11, the holes 80 and the screw holes 82 are provided at positions corresponding to respective spaces of the oxygen-containing gas supply unit 67 formed between the first and second bridges 34, 60.

In FIG. 1, for example, the end plate 70a is a stainless plate. The diameter of the end plate 70b is larger than the diameter of the end plate 70a. For example, the end plate 70a is a thin electrically conductive stainless plate, having the thickness of about several tens of μm.

The casing 18 includes a first case unit (first electrically conductive casing) 86a containing the load applying mechanism 21 and a second case unit (second electrically conductive casing) 86b containing the fuel cell stack 12 and the fluid unit 19. For example, the first and second case units 86a, 86b are made of nickel-based heat resistant alloy.

A ring-shaped insulating member 87a is interposed between the end plate 70b and the second case unit 86b. The first case unit 86a and the second case unit 86b are tightened together by screws 88 and nuts 90. The screws 88 and the nuts 90 are electrically insulated from the first and second case units 86a, 86b by cylindrical or ring-shaped insulating members 87b, 87c, 87d.

The end plate 70b is an electrically conductive plate connected to the first case unit 86a, and functions as a gas heat barrier for preventing entry of the hot exhaust gas or the hot air (hereinafter also referred to as the "hot gas") from the fuel cell stack 12 and the fluid unit 19 into the load applying mechanism 21. Further, after the oxygen-containing gas supplied to the oxygen-containing gas supply unit 67 of the fuel cell 11 flows into the first case unit 86a, the gas heat barrier prevents the oxygen-containing gas from flowing from the first case unit 86a into the second case unit 86b. Therefore, the oxygen-containing gas is not discharged as the exhaust gas without being consumed in power generation.

A first current collecting terminal 91a is provided at an arbitrary position of the first case unit 86a. The first current collecting terminal 91a is electrically connected to one pole of the fuel cell stack 12 through the end plate 70b. A second current collecting terminal 91b is provided at an arbitrary position of the second case unit 86b. The second current collecting terminal 91b is electrically connected to the other pole of the fuel cell stack 12 through the end plate 70a and the heat exchanger 14.

An end of a cylindrical shaped wall plate 92 is joined to the second case unit 86b, and a head plate 94 is fixed to the other end of the wall plate 92. The fluid unit 19 is provided symmetrically with respect to the central axis of the fuel cell stack 12. Specially, the substantially cylindrical reformer 16 is provided coaxially inside the substantially ring shaped heat exchanger 14. The heat exchanger 14 and the reformer 16 are fixed to a wall plate 96, and the wall plate 96 is fixed to the groove 74 around the end plate 70a. A chamber 98 is formed between the end plate 70a and the wall plate 96.

A fuel gas supply pipe 100 and a reformed gas supply pipe 102 are connected to the reformer 16. The fuel gas supply pipe 100 extends to the outside from the head plate 94. The reformed gas supply pipe 102 is inserted into the hole 78 of the end plate 70a, and connected to the fuel gas supply passage 30.

An air supply pipe 104 and an exhaust gas pipe 106 are connected to the head plate 94. A channel 108 extending from the air supply pipe 104 to the chamber 98 through the heat exchanger 14 and a channel 110 extending from the exhaust gas channel 68 of the fuel cell stack 12 to the exhaust gas pipe 106 through the heat exchanger 14 are provided in the casing 18.

The load applying mechanism 21 includes a first tightening unit 112a for applying a first tightening load T1 to a region around (near) the fuel gas supply passage 30 and a second tightening unit 112b for applying a second tightening load T2 to the electrolyte electrode assemblies 26. The second tightening load T2 is smaller than the first tightening load T1 (T1>T2).

Figure 8:
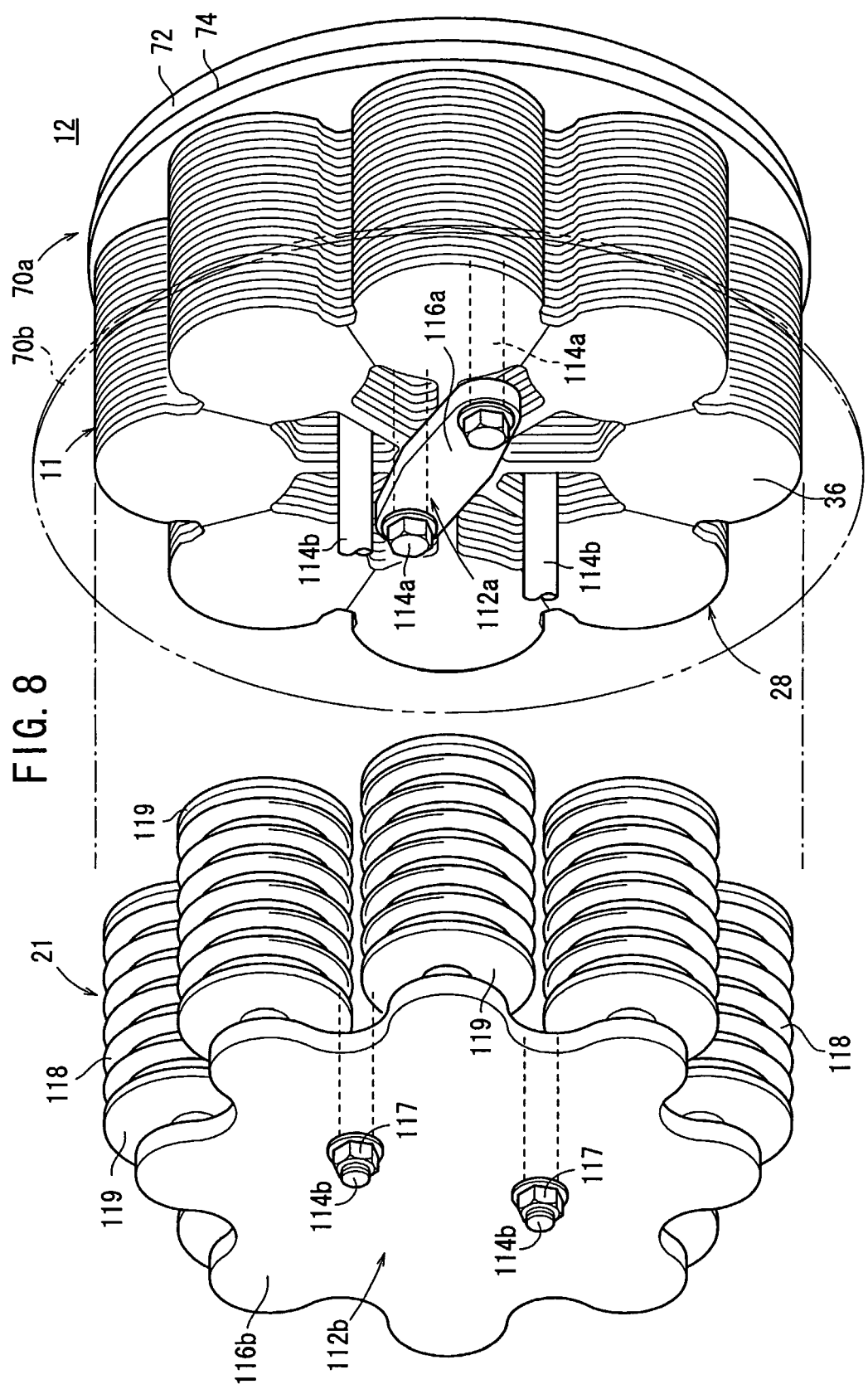
FIG. 8 is a partial exploded perspective view showing a load applying mechanism of the fuel cell system.

As shown in FIGS. 1, 2, and 8, the first tightening unit 112a includes short first tightening bolts 114a screwed into the screw holes 82 provided along one diagonal line of the end plate 70a. The first tightening bolts 114a extend in the stacking direction of the fuel cells 11, and engage a first presser plate 116a. The first tightening bolts 114a are provided in the oxygen-containing gas supply unit 67 in the separators 28. The first presser plate 116a is a narrow plate, and engages the central position of the separator 28 to cover an insulating seal 69 of the fuel gas supply passage 30.

The second tightening unit 112b includes long second tightening bolts 114b screwed into the screw holes 82 provided along the other diagonal line of the end plate 70a. Ends of the second tightening bolts 114b extend through a second presser plate 116b having a curved outer section. Nuts 117 are fitted to the ends of the second tightening bolts 114b. The second tightening bolts 114b are provided in the oxygen-containing gas supply unit 67 in the separators 28.

The thickness of the second presser plate 116b in the stacking direction is small in comparison with the first presser plate 116a. Springs (spring members) 118 and spring seats 119 are provided in respective circular portions of the second presser plate 116b, at positions corresponding to the electrolyte electrode assemblies 26 on the circular disks 36 of the fuel cell 11. For example, the springs 118 are ceramics springs.

Operation of the fuel cell system 10 will be described below.

As shown in FIG. 3, in assembling the fuel cell system 10, firstly, the separator 28 is joined to the channel member 56 on its surface facing the cathode 22. Therefore, the fuel gas supply channel 66 connected to the fuel gas supply passage 30 is formed between the separator 28 and the channel member 56. The fuel gas supply channel 66 is connected to the fuel gas channel 46 through the fuel gas inlet 54 (see FIG. 6). The ring shaped insulating seal 69 is provided on each of the separators 28 around the fuel gas supply passage 30.

In this manner, the separator 28 is fabricated. Eight electrolyte electrode assemblies 26 are interposed between the separators 28 to form the fuel cell 11. As shown in FIGS. 3 and 4, the electrolyte electrode assemblies 26 are interposed between the surface 36a of one separator 28 and the surface 36b of the other separator 28. The fuel gas inlet 54 of the circular disk 36 is positioned at the center in each of the anodes 24.

A plurality of the fuel cells 11 are stacked in the direction indicated by the arrow A, and the end plates 70a, 70b are provided at opposite ends in the stacking direction. As shown in FIGS. 1 and 8, the first presser plate 116a of the first tightening unit 112a is provided at the center of the fuel cell 11. The first presser plate 116a has a minimum size necessary for receiving the load in the stacking direction.

In this state, the short first tightening bolts 114a are inserted through the first presser plate 116a and the end plate

70b toward the end plate 70a. Tip ends of the first tightening bolts 114a are screwed into, and fitted to the screw holes 82 formed along one of the diagonal lines of the end plate 70a. The heads of the first tightening bolts 114a engage the first presser plate 116a. The first tightening bolts 114a are screwed into the screw holes 82 to adjust the surface pressure of the first presser plate 116a. In this manner, in the fuel cell stack 12, the first tightening load T1 is applied to the seal region near the fuel gas supply passage 30.

Then, the springs 118 and the spring seats 119 are aligned axially with the electrolyte electrode assemblies 26 at respective positions of the circular disks 36. The second presser plate 116b of the second tightening unit 112b engage the spring seats 119 provided at one end of the springs 118.

Then, the long second tightening bolts 114b are inserted through the second presser plate 116b and the end plate 70b toward the end plate 70a. The tip end of the second tightening bolts 114b are screwed into, and fitted to the screw holes 82 formed along the other diagonal line of the end plate 70a. The nuts 117 are fitted to the heads of the second tightening bolts 114b. Therefore, by adjusting the state of the screw engagement between the nuts 117 and the second tightening bolts 114b, the second tightening load T2 is applied to the electrolyte electrode assemblies 26 by the elastic force of the respective springs 118.

The end plate 70b of the fuel cell stack 12 is sandwiched between the first case unit 86a and the second case unit 86b of the casing 18. The insulating member 87a is interposed between the second case unit 86b and the end plate 70b. The insulating members 87b, 87c, 87d are provided at predetermined positions, and the first case unit 86a and the second case unit 86b are fixed together by the screws 88 and the nuts 90.

The fluid unit 19 is attached to the second case unit 86b. A wall plate 96 of the fluid unit 19 is attached to the groove 74 around the end plate 70a. Thus, a chamber 98 is formed between the end plate 70a and the wall plate 96.

Next, in the fuel cell system 10, as shown in FIG. 1, a fuel (methane, ethane, propane, or the like) and, as necessary, water are supplied from the fuel gas supply pipe 100, and an oxygen-containing gas (hereinafter referred to as "air") is supplied from the air supply pipe 104.

The fuel is reformed when it passes through the reformer 16 to produce a fuel gas (hydrogen-containing gas). The fuel gas is supplied to the fuel gas supply passage 30 of the fuel cell stack 12. The fuel gas moves in the stacking direction indicated by the arrow A, and flows into the fuel gas supply channel 66 through the slit 62 in the separator 28 of each fuel cell 11 (see FIG. 6).

The fuel gas flows along the fuel gas supply channel 66 between the first and second bridges 34, 60, and flows into the fuel gas channel 46 from the fuel gas inlets 54 of the circular disks 36. The fuel gas inlets 54 are formed at positions corresponding to central regions of the anodes 24 of the electrolyte electrode assemblies 26. Thus, the fuel gas is supplied from the fuel gas inlets 54 to the substantially central positions of the anodes 24, and flows outwardly from the central regions of the anodes 24 along the fuel gas channel 46.

As shown in FIG. 1, air from the air supply pipe 104 flows through the channel 108 of the heat exchanger 14, and temporarily flows into the chamber 98. The air flows through the holes 80 connected to the chamber 98, and is supplied to the oxygen-containing gas supply unit 67 provided at substantially the center of the fuel cells 11. At this time, in the heat exchanger 14, as described later, since the exhaust gas discharged to the exhaust gas channel 68 flows through the channel 110, heat exchange between the air before supplied to the fuel cells 11 and the exhaust gas is performed. Therefore, the air is heated to a desired fuel cell operating temperature beforehand.

The oxygen-containing gas supplied to the oxygen-containing gas supply unit 67 flows into the space between the inner circumferential edge of the electrolyte electrode assembly 26 and the inner circumferential edge of the circular disk 36 in the direction indicated by the arrow B, and flows toward the oxygen-containing gas channel 50. As shown in FIG. 6, in the oxygen-containing gas channel 50, the air flows from the inner circumferential edge (central region of the separator 28) to the outer circumferential edge (outer region of the separator 28) of, i.e., from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the air flows in one direction indicted by the arrow B on the electrode surface of the cathode 22. At this time, oxygen ions flow through the electrolyte 20 toward the anode 24 for generating electricity by electrochemical reactions.

The exhaust gas discharged to the outside of the respective electrolyte electrode assemblies 26 flows through the exhaust gas channel 68 in the stacking direction. When the exhaust gas flows through the channel 110 of the heat exchanger 14, heat exchange between the exhaust gas and the air is carried out. Then, the exhaust gas is discharged into the exhaust gas pipe 106.

In the first embodiment, as shown in FIG. 1, the casing 18 includes the first and second case units 86a, 86b. For example, the first and second case units 86a, 86b are made of electrically conductive heat resistant alloy. The first and second case units 86a, 86b are tightened together by the screws 88 and the nuts 90, and the insulating members 87a to 87d are interposed between the first and second case units 86a, 86b. Thus, the first and second case units 86a, 86b are electrically insulated from each other.

The electrically conductive end plate 70b of the fuel cell stack 12 directly contacts the first case unit 86a. The entire first case unit 86a is electrically connected to one pole (e.g., cathode) of the fuel cells stack 12. The electrically conductive end plate 70a of the fuel cell stack 12 is electrically connected to the second case unit 86b through the electrically conductive wall plate 96 and the heat exchanger 14. Thus, the entire second case unit 86b is electrically connected to the other pole (e.g., anode) of the fuel cell stack 12.

Therefore, it is possible to provide the first and second current collecting terminals 91a, 91b at arbitrary positions of the first and second case units 86a, 86b, respectively. Thus, for example, by providing the first and second current collecting terminals 91a, 91b at positions of the first and second case units 86a, 86b where the temperature is low, heat is not removed from the first and second current collecting terminals 91a, 91b. Consequently, improvement in the heat efficiency is achieved easily.

Further, the positions of the first and second current collecting terminals 91a, 91b are arbitrarily determined without any constraints. Therefore, with the simple and compact structure, the layout of the fuel cell system 10 can be determined freely.

The load applying mechanism 21 is provided in the first case unit 86a, and the fuel cell stack 12, the heat exchanger 14, and the reformer 16 are provided in the second case unit 86b. It is possible to prevent heat transmission to the load applying mechanism 21 which, in effect, does not need heat transmission. Thus, heat is concentrated at the fluid unit 19 which needs the heat flow. Accordingly, improvement in the overall heat efficiency of the fuel cell system 10 is achieved.

Further, the end plate 70b is interposed between the first and second case units 86a, 86b. The end plate 70b functions as a gas heat barrier for preventing the flow of the hot gas from the second case unit 86b to the first case unit 86a. Thus, transmission of the hot gas or heat from the second case unit 86b to the first case unit 86a is suppressed suitably, and improvement in the durability of the load applying mechanism 21 is improved.

Further, after the oxygen-containing gas supplied to the oxygen-containing gas supply unit 67 of the fuel cell 11 flows into the first case unit 86a, the gas barrier prevents the flow of the oxygen-containing gas from the first case unit 86a into the second case unit 86b. Therefore, the oxygen-containing gas which has not been consumed in the power generation is not discharged from the first case unit 86a to the exhaust gas channel 68 of the second case unit 86b. Consumption of the oxygen-containing gas is reduced economically, and improvement in the power generation efficiency is achieved.

The end plate 70b is an electrically conductive plate. In addition to the function of the gas barrier, the end plate 70b has the function of allowing the flow (conduction) of the electrical current generated in the fuel cell stack 12. Thus, lead wires are not required, and the heat is not removed through the lead wires. Accordingly, the heat capacity is reduced, and reduction of the heat loss is achieved.

Further, the end plate 70b is a stainless plate having the thickness of about several tens of μm. Therefore, the end plate 70b has the desired flexibility, and can absorb heat expansion or dimensional variation effectively.

FIG. 9 is a partial cross sectional view showing a fuel cell system 120 according to a second embodiment of the present invention. The constituent elements of the fuel cell system 120 that are identical to those of the fuel cell system 10 according to the first embodiment are labeled with the same reference numeral, and description thereof will be omitted.

The fuel cell system 120 includes a fuel cell stack 122. A circular disk shaped outer portion 124a is formed integrally with an end plate 124 of the fuel cell stack 122. The circumferential surface of the outer portion 124a contacts the inner wall surface of the second case unit 86b. For example, the end plate 124 is made of electrically conductive material such as a stainless plate. Openings 126 such as recesses or holes are formed in the outer portion 124a at predetermined angles (intervals). The openings 126 are connected to the exhaust gas channel 68 of the fuel cell stack 122, and the channel 110 of the heat exchanger 14. Preferably, the thickness of the outer portion 124a of the end plate 124 is small to have the required flexibility when taking heat expansion or the like into consideration.

In the second embodiment having the above structure, one pole of the fuel cell stack 122 is electrically connected to the first case unit 86a through the end plate 70b, and the other pole of the of the fuel cell stack 122 is electrically connected to the second case unit 86b through the end plate 124.

Thus, the same advantages as in the case of the first embodiment can be obtained. For example, it is possible to provide the first and second current collecting terminals 91a, 91b at arbitrary positions. Further, since the outer portion 124a of the end plate 124 directly contacts the inner surface of the second case unit 86b, the length of the electrical conduction path is reduced.

INDUSTRIAL APPLICABILITY

According to the present invention, the first electrically conductive casing is electrically connected to one pole of the fuel cell stack, and the second electrically conductive casing is electrically connected to the other pole of the fuel cell stack. Therefore, it is possible to provide the current collecting terminals at arbitrary positions of the first electrically conductive casing and the second electrically conductive casing.

Thus, for example, by providing the current collecting terminals at positions of the casings where the temperature is low, heat is not removed from the current collecting terminals. Accordingly, improvement in the heat efficiency is achieved. Further, the positions of the current collecting terminals can be determined without any constraints. Therefore, with the simple and compact structure, the layout of the fuel cell system can be designed freely.

The invention claimed is:

1. A fuel cell system comprising:
a fuel cell stack formed by stacking a plurality of fuel cells in a stacking direction, said fuel cells each including an electrolyte electrode assembly and separators sandwiching said electrolyte electrode assembly, said electrolyte electrode assembly including an anode, a cathode, and an electrolyte interposed between said anode and said cathode, said fuel cell stack being provided in a casing, wherein
said casing includes first and second electrically conductive casings, and said first and second electrically conductive casings are fixed such that an insulating member is interposed between said first and second electrically conductive casings for electrically insulating said first and second electrically conductive casings from each other;
a gas barrier is provided between said first electrically conductive casing and said second electrically conductive casing for preventing a flow of an exhaust gas from said second electrically conductive casing into said first electrically conductive casing;
said first electrically conductive casing is electrically connected to one pole of said fuel cell stack;
said second electrically conductive casing is electrically connected to the other pole of said fuel cell stack; and
said gas barrier electrically connects said first electrically conductive casing to the one pole of said fuel cell stack.

2. A fuel cell system according to claim 1, wherein a load applying mechanism for applying a tightening load to said fuel cell stack in the stacking direction is provided in said first electrically conductive casing; and
said fuel cell stack, a heat exchanger for performing heat exchange between an oxygen-containing gas to be supplied to said fuel cell stack and an exhaust gas discharged from said fuel cell stack, and a reformer for reforming a fuel to produce a fuel gas are provided in said second electrically conductive casing.

3. A fuel cell system according to claim 1, wherein said gas barrier includes an electrically conductive end plate for electrically connecting said one pole of said fuel cell stack and said first electrically conductive casing.

4. A fuel cell system according to claim 3, wherein an electrically conductive end plate is provided at an end of said fuel cell stack opposite to said gas barrier for electrically connecting said other pole of said fuel cell stack and said second electrically conductive casing.

5. A fuel cell system according to claim 1, wherein said first and second electrically conductive casings have first and second current collecting terminals, respectively.

* * * * *